United States Patent
Shamsi et al.

(10) Patent No.: US 10,860,949 B2
(45) Date of Patent: Dec. 8, 2020

(54) FEATURE TRANSFORMATION OF EVENT LOGS IN MACHINE LEARNING

(71) Applicant: OATH (AMERICAS) INC., Dulles, VA (US)

(72) Inventors: Davood Shamsi, New York, NY (US); Hans Marius Holtan, San Jose, CA (US); Yuan Tian, Mountain View, CA (US); Jing Wang, San Jose, CA (US)

(73) Assignee: Verizon Media Inc., New York, NY (US)

( * ) Notice: Subject to any disclaimer, the term of this patent is extended or adjusted under 35 U.S.C. 154(b) by 727 days.

(21) Appl. No.: 15/144,399

(22) Filed: May 2, 2016

(65) Prior Publication Data

US 2017/0316343 A1 Nov. 2, 2017

(51) Int. Cl.
*G06N 20/00* (2019.01)
*G06F 11/34* (2006.01)

(52) U.S. Cl.
CPC ......... *G06N 20/00* (2019.01); *G06F 11/3438* (2013.01); *G06F 11/3476* (2013.01); *G06F 11/3495* (2013.01); *G06F 2201/865* (2013.01)

(58) Field of Classification Search
CPC ............. G06F 11/3476; G06F 11/3495; G06F 11/3438; G06F 2201/865; G06N 99/005; G06N 20/00
See application file for complete search history.

(56) References Cited

U.S. PATENT DOCUMENTS

| | | | | |
|---|---|---|---|---|
| 2009/0006363 A1* | 1/2009 | Canny | .................... | G06Q 30/02 |
| 2010/0114654 A1* | 5/2010 | Lukose | .................. | G06Q 30/00 |
| | | | | 705/14.54 |
| 2014/0046895 A1* | 2/2014 | Sowani | ............. | G06Q 30/0201 |
| | | | | 706/52 |
| 2015/0205691 A1* | 7/2015 | Seto | ...................... | G06F 11/008 |
| | | | | 702/182 |

OTHER PUBLICATIONS

Zhao et al., "SEISMIC: A Self-Exciting Point Process Model for Predicting Tweet Popularity", Aug. 10-13, 2015, Proceedings of the 21th ACM SIGKDD International Conference on Knowledge Discovery and Data Mining, pp. 1-10 (Year: 2015).*
MacKinlay et al., "Estimating self-excitation effects for social media using the Hawkes process", Apr. 13, 2015, Seminar for Statistics/ D-MTEC, ETH Zürich, pp. 1-106 (Year: 2015).*

* cited by examiner

*Primary Examiner* — Kamran Afshar
*Assistant Examiner* — Brent Johnston Hoover
(74) *Attorney, Agent, or Firm* — Cooper Legal Group, LLC

(57) ABSTRACT

Embodiments of the present invention provide systems, methods, and computer storage media directed at transforming event logs into features for use in machine learning. In embodiments, a method may include receiving an event log for a user. The event log can indicate an occurrence of a first event associated with the user. The method can also include generating a feature value for the first event. The feature value can be indicative of an amount of time that has passed since the occurrence of the first event. Based, at least in part, (Continued)

on the feature value, an occurrence of a second event can be predicted utilizing a predictive model. The prediction can then be output to enable targeted content associated with the second event to be delivered to the user. Other embodiments may be described and/or claimed herein.

18 Claims, 7 Drawing Sheets

FEATURE TRANSFORMATION OF EVENT LOGS IN MACHINE LEARNING

TECHNICAL FIELD

The present disclosure relates generally to machine learning. More specifically, and without limitation, the present disclosure relates to systems and methods associated with transforming event logs into features for machine learning.

BACKGROUND

In supervised machine learning, a set of input data is utilized in conjunction with known responses to train a model to predict responses for new data. Under conventional supervised machine learning processes this input data can include binary values that indicate whether an action was performed. These binary values are only capable of conveying either a '1' typically indicating the action was performed or a '0' typically indicating the action was not performed. There is no indication from these binary values of when the action was performed or a frequency with which the action was performed. As such a great deal of information can be lost in such a binary representation.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

DETAILED DESCRIPTION OF THE EMBODIMENTS

Reference will now be made in detail to illustrative embodiments of the invention, examples of which are illustrated in the accompanying drawings. Wherever possible, the same reference numbers will be used throughout the drawings to refer to the same or like parts.

At a high level, aspects of the embodiments disclosed herein relate to transformation of event logs into feature values that are encoded with temporal and frequency information for events captured within the event logs. To accomplish this, these feature values can be generated in a manner to encode information concerning an amount of time that has passed since an event associated with the feature value occurred and/or a frequency of the occurrence of the event associated with the feature value. These feature values can enable the machine learning process to take this temporal and frequency information into account when generating a predictive model and utilizing such a predictive model to predict outcomes based on new feature values.

Figure 1:
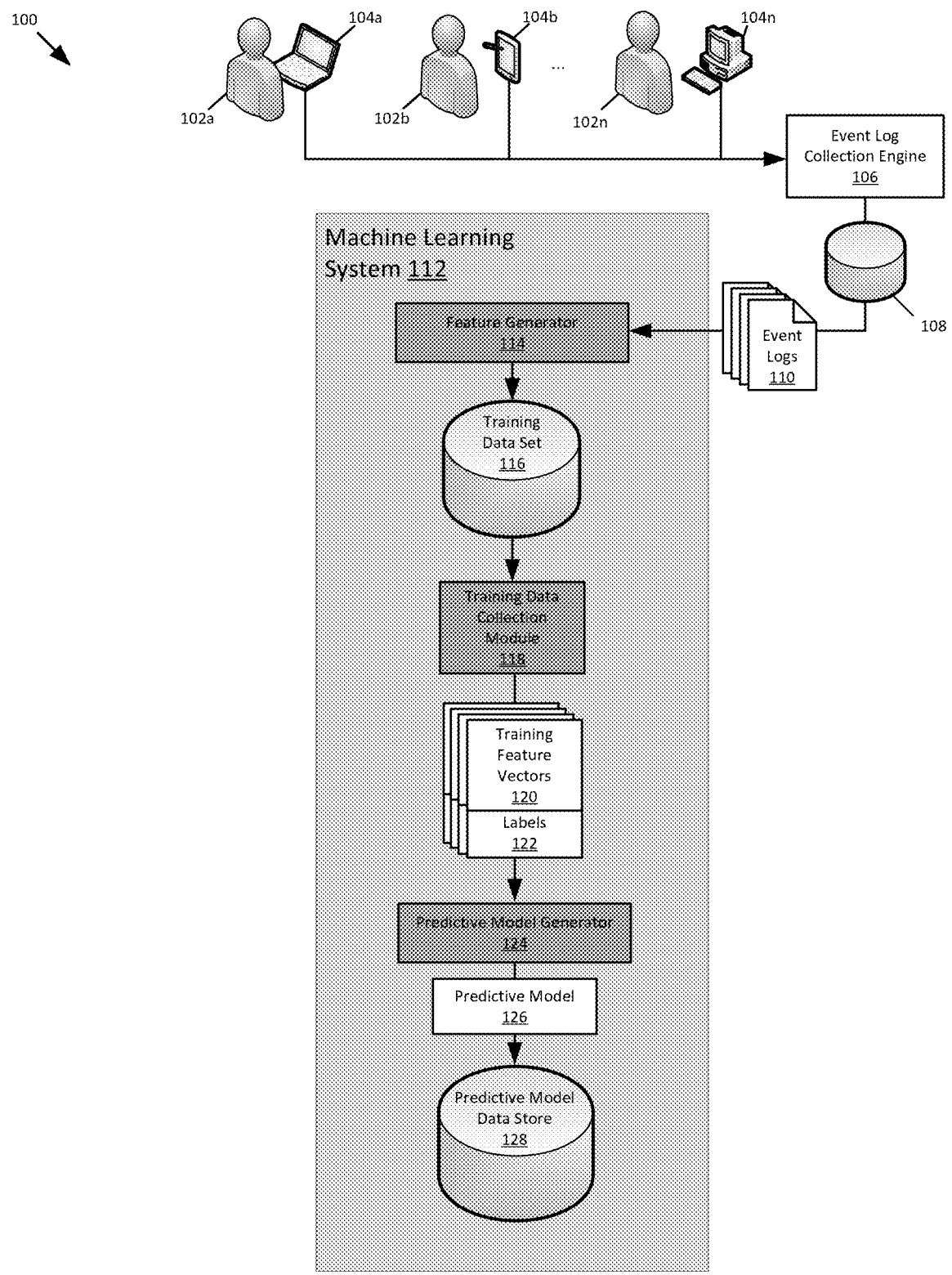
FIG. 1 depicts an illustrative machine learning environment performing an example machine learning training process, in accordance with embodiments of the present disclosure.

FIG. 1 depicts an illustrative machine learning environment 100, in accordance with embodiments of the present disclosure. As depicted, machine learning environment 100 includes users 102a-102n that are respectively operating computing devices 104a-104n. Each of users 102a-102n can interact with one or more applications that are being executed by computing devices 104a-104n. A subset of these interactions can be captured as events in one or more event log entries associated with the respective user. As used herein, an event can include any interaction that occurs between the user and the one or more applications. These events can include, for example: websites visited by the user; application usage by the user; the user viewing content presented by a website or application; the user clicking on content presented by a website or application; the user procuring products or services that are presented by content displayed on a website or application (e.g., conversion); etc. In various embodiments, this content could be targeted content such as, for example, promotional content targeted at the user of the computing device. Each event log entry can include, for example: an identifier of the event that precipitated the event log entry; an indicator of a time at which the identified event occurred; an indicator of the user and/or computing device that initiated the event; a type of the event (e.g., viewed website, conversion, etc.); any other suitable information concerning the event; or any combination thereof. The interactions can be captured via, for example, web beacons, pixel tracking, application monitoring, etc. It will be appreciated that these mechanisms for tracking the interaction of a user with a website or application are merely meant to be illustrative in nature and that any suitable mechanism for tracking such interactions can be used without departing from the scope of this disclosure.

Event log collection engine 106 can be configured to collect the above described event log entries and aggregate these entries into event logs for each of users 102a-102n. In various embodiments, these event log entries may be aggregated into event logs with non-event data, or event independent data, such as user demographic information that can include, for example, gender of the user, geographic location of the user, etc. Event log collection engine can then store the event logs for each user in event log data store 108. While depicted as a single component, it will be appreciated that event log collection engine 106 may be distributed across any number of servers or other computing devices, including computing devices 104a-104n. Likewise, event log data store 108 can be distributed across any number of databases, or other suitable storage mechanisms, such as, for example, a Hadoop Distributed File System (HDFS).

Machine learning environment 100 includes a machine learning system 112. Machine learning system 112 can be configured to utilize event logs 112 to generate a predictive model that is capable of predicting the occurrence of a given event for a given user. To accomplish this, machine learning system 112 can take the event logs 110 produced by event log collection engine as input. Event logs can be accessed periodically (e.g., randomly, at set intervals, or in response to a request submitted by a user of the machine learning system) from event log data store 108 or could be provided directly from event log collection engine 106 to machine learning system 112. Machine learning system 112 can be configured to utilize event logs 110 to produce, or update, a predictive model, as described herein.

In machine learning system 112, event logs 110 can be initially processed by feature generator 114. Feature generator 114 can be configured to transform event logs 110 into features suitable for the machine learning process. These features can take the form of, for example, feature vectors for each of users 102a-102n. In embodiments, each feature can be associated with any of the above mentioned events, or non-event demographic information. To produce these features, the feature generator 114 can be configured to generate a feature value associated with each feature. This feature value can be generated in a manner to encode information concerning an amount of time that has passed since an event associated with the feature occurred and/or a frequency of the occurrence of the event associated with the feature.

Generating a feature value that encodes information concerning an amount of time that has passed since the occurrence of an associated event can be accomplished, in various embodiments, by assigning an initial value for an occurrence of the associated event to the feature value. A decay factor can then be applied to reduce the feature value over time. Such a decay factor could be exponential or linear in nature. For instance, where an event entry of an event log for a user indicates the user visited website 'A' at time 'T,' feature generator 114 could initially assign a value 'x' as the feature value for the feature associated with website A. Feature generator 114 could then reduce the feature value 'x' based on a function of the amount of time that has passed since time 'T' (e.g., f(T)). In some embodiments, 'x' could be a uniform value across events (i.e., each event is initially assigned the same feature value). In other embodiments, 'x' could be event dependent such that one or more feature values are assigned different initial values based on the event associated with the feature value.

Generating a feature value that encodes information concerning a frequency of the occurrence of an event associated with the feature can be accomplished by assigning an initial value for a first occurrence of the event to the corresponding feature value. A jump factor can then be applied for each additional occurrence of the event to increase the feature value for each occurrence. For instance, where event entries, of an event log for a user, indicates the user visited website 'A' three times, feature generator 114 could initially assign a value 'y' as the feature value for the feature associated with website A. Feature generator 114 could then increase the feature value 'y' utilizing the jump factor based on each additional occurrence of the event. The amount by which each occurrence increases the feature value is referred to herein as a jump factor. In some embodiments, the jump factor could be a uniform value across events (i.e., each event occurrence causes the same increase to an associated feature value regardless of the event). In other embodiments, the jump factor could be event dependent such that one or more feature values are increased in different amounts based on the event associated with the feature value. Likewise, in some embodiments, the jump factor could be a uniform value across all occurrences of an event (i.e., each event occurrence causes the same increase to an associated feature value regardless of the occurrence). In other embodiments, the jump factor could be occurrence dependent such that the jump factor changes depending on the occurrence of the event. For example, a first occurrence of an event may cause the associated feature value to increase by value 'a,' while a second occurrence of the event may cause the associated feature value to increase by 'b.'

In some embodiments, feature generator 114 may be configured to utilize both the above discussed decay factor and jump factor to generate a feature value that encodes both a frequency of the occurrences of an associated event in conjunction with the passage of time since each occurrence of the associated event. For example, consider a user 'u' for which the events $E_1, E_2, \ldots E_n$ have been logged at times $T_1, T_2, \ldots$, Tn for visiting website 'A.' Feature generator could be configured to utilize the jump factor for each occurrence, reduced by the decay factor to account for the time that has passed since the respective occurrence to generate a feature value that reflects both frequency and passage of time. In a specific example, the feature value can be generated in accordance with the following equation:

$$f_E(T) = \Sigma_{i:E_i=E} J_E e^{-\lambda_E(T-T_i)} \qquad \text{Eq.1}$$

where $f_E(T)$ is the feature value of event E at time T for the user, $\lambda_E$ is the decay factor for event E, and $J_E$ is the jump factor for event E. For example, in accordance with Equation 1, consider user 'u' that has visited site A at times 100 and 200, then at time 250, the feature value associated with site A for the user would be $J_E e^{-\lambda_E(250-100)} + J_E e^{-\lambda_E(250-200)}$. In this example, if $\lambda_E=0.01$ and $J_E=1$, then the feature value is $e^{-1(250-100)} + e^{-.001(250-200)} = e^{-1.5} + e^{-0.5} = 0.8296$. FIG. 8, discussed below, depicts how the feature values evolve over time and occurrences.

As discussed above, and indicated in Equation 1, in some embodiments, the jump factor and decay factor can be event specific. As such, jump factors and decay factors for each event can be selected to either conserve or retire features associated with the events in various time spans by adjusting the respectively associated feature value. A relatively small decay factor would keep a feature associated with an event in the system for a longer time than a larger decay factor. Likewise, a relatively large jump factor could accomplish a similar effect as compared with a smaller jump factor. For example, using appropriate values for jump and/or decay, a feature associated with visiting site A can be maintained for months, while a feature associated with visiting site B can be maintained for only days or weeks. This differentiation in how long features can be maintained could be important when trying to predict the occurrence of a first event that may have more lead time than a second event. For example, suppose a user visits a site that includes a review of a restaurant. The visiting of the site can indicate that the user is likely to visit a restaurant, or make a reservation for a restaurant, in a relatively short time frame (e.g., within an hour, day, or week). As such, a feature associated with visiting such a site may be retired more quickly using a larger decay factor, a smaller jump factor, or a combination of the two. In contrast, suppose a user visits a site that includes a review of a car. The visiting of the site can indicate that the user is likely to acquire a car in a relatively longer time frame (e.g., within a week, month, 3 months). As such, a feature associated with visiting such a site may be retired more slowly using a smaller decay factor, a larger jump factor, or a combination of the two.

As an even further extreme, as mentioned above, the event logs may also include non-event, or event independent, information. Feature generator 114 can also be configured to generate feature values for this non-event information in a similar manner to generating a feature value for an instance of an event. The non-event user demographic information may change infrequently (e.g., age/age range, address, etc.) or not all (e.g., gender), at least for general cases. As such, the decay rate may be set to be very small, or even 0, for these features to be maintained for a very long period of time.

While a small decay factor can help the system maintain a feature in the history for a longer time period of time than a larger decay factor, a small decay factor can also make distinguishing between more recent events and more historical events difficult. For example, if a first user has visited a site that included a review of a smart phone 3 months ago, and a second user visited the same site yesterday, the two users are not equally likely to acquire a phone the next day. The probability that the second user acquires a phone is higher. So a large decay value which would retire event occurrences more quickly can be beneficial in various instances.

In some embodiments, there could be multiple categories of decay factors and jump factors that can address the variable nature with which a feature should be retired. As a simple example of this, there could be three categories, a first category which provides for relatively slow decay to maintain features associated with the first category of decay for a longer period of time, a second category which provides for relatively quick decay to more quickly retire features associated with the second category of decay, and a third category of decay that falls in between the first and second categories of decay.

In some instances, feature generator 114 can be configured to update an existing feature value that has already been calculated for a given feature. In such instances, it can be desirable to be able to update the existing feature value utilizing newly collected event data without the need to access the previous event data that was utilized to calculate the existing feature value. This updating of an existing feature value is referred to herein as incremental updating. The ability to perform this incremental updating can enable the previous event data to be deleted, freeing up valuable space, while also reducing the amount of data that is transmitted between components, freeing up bandwidth, and reducing the number of calculations that are performed, thereby increasing the efficiency of the computing device(s) on which feature generator 114 is being executed. To accomplish this incremental updating, feature generator 114 can be configured to apply the decay rate for the respectively associated event to the existing feature value based on an amount of time that has passed since the existing feature value was calculated. An incremental feature value for the newly collected event data can then be calculated, in a similar manner to that described herein in reference to generating a first feature value. This incremental feature value can then be added to the existing feature value, that has had the decay rate applied to it, to produce an updated feature value. For example, if at time $T^a$ feature value for event E is $f_E(T^a)$, then we can calculate feature value at time $T^b$ in accordance with the following equation:

$$f_E(T^b) = f_E(T^a)e^{-\lambda_E(T^b-T^a)} + \sum_{i:\, E_i=E \& T^a<T_i\leq T^b} J_E e^{-\lambda_E(T-T_i)} \quad \text{Eq. 2}$$

where $f_E(T^a) e^{-\lambda_E(T^b-T^a)}$ represents the existing feature value with the decay rate, $\lambda_E$, applied for based on the amount of time that has passed since the existing feature value was calculated, $T^b-T^a$; and $\Sigma_{i:\, E_i=E\&T^a<T_i\leq T^b}J_E e^{-\lambda_E(T-T_i)}$ represents the incremental feature value for those events that have occurred since the existing feature value was calculated.

Because the jump factor for an event acts to increase the feature value for that event based on occurrences of that event, in some embodiments, it may be desirable to limit the maximum value that can be assigned to a feature value. This can reduce the chances that a very large feature value will result from events that occur an abnormally large number of times. For example, instances where a website continually reloads, or refreshes, may lead to an abnormally large feature value. This relationship can be represented by the following equation:

$$f_E(T^b) = \quad \text{Eq. 3}$$
$$\text{Min}\left\{M_E, f_E(T^a)e^{-\lambda(T^b-T^a)} + \sum_{i:\, E_i=E\&T^a<T_i\leq T^b} J_E e^{-\lambda_E(T-T_i)}\right\}$$

where $M_E$ represents the maximum feature value allowed for event E, and the Min operator returns the minimum value from the set. While depicted in Equation 3 as being event dependent, in other embodiments, the maximum feature value can be uniform across all events. In such embodiments, $M_E$ from Equation 3 could be replaced by M. In addition, while Equation 3 is depicted based on Equation 2, it will be appreciated that Equation 2 within Equation 3 could be replaced by Equation 1 without departing from the scope of this disclosure.

In some embodiments, feature generator 114 can be configured to generate network level features for a user. These network level features would represent aggregate events for the user, such as, for example, number of instances the user visited a website, without regard to the specific website, number of products or services acquired by the user in response to targeted content, also referred to as conversions, without regard to the product or service.

Feature generator 114 can store the generated features, including the feature values, in training data set 116. Training data set 116 can be stored in one or more databases, or in any other suitable manner. In addition, training data set 116 can be distributed across any number of computing devices.

Training data collection module 118 can be configured to collect training data from the features that are stored in training data set 116. The collected training data can be utilized in generating a predictive model that is capable of predicting the occurrence of a given event for a given user. As such, the training data collection module 118 may need to be aware of the given event for which the predictive model is being generated. Such a given event can be defined by a user (e.g., administrator) of machine learning system 112. To accomplish this, training data collection module 118 can be configured to select a quantity of positive users, those for which the features indicate that the given event occurred, and a quantity of negative users, those for which the features indicate that the given event did not occur. For instance, suppose 'a' positive users and 'b' negative users are needed to generate the predictive model for event 'e.' Now suppose that there are a total of 'A' positive users and 'B' negative users in training data set 116 for event 'e.' In such a scenario, training data collection module 118 can be configured to select a user 'u' with probability of $P_1=$ a/A if the user is positive and probability $P_2$=b/B if the user is negative to assemble suitable training data for event e. The features associated with each of the selected users can be output from machine learning system 112 as training features, depicted here as training feature vectors 120.

In some embodiments, it may be desirable to predict the likelihood of a given event in a specific period of time, $T_f$. In such embodiments, a time horizon for each user in training data set 116 can be divided into segments of length $T_f$ beginning at a starting time $T_0$. As such, the segments of the time horizon could be represented as $[T_0, T_0+T_f)$, $[T_0+T_f, T_0+2T_f)$, $[T_0+2T_f, T_0+3T_f)$, . . . . If a user time horizon indicates the occurrence of the given event in time period $[T_0+m*T_f, T_0+(m+1)*T_f)$, then the time period is selected in accordance with probability $P_1$, described above, otherwise the time period is selected with probability $P_2$, also described above. In this process, $P_1$ and $P_2$ are selected to obtain a desired number of positive and negative samples, respectively.

Figure 5:
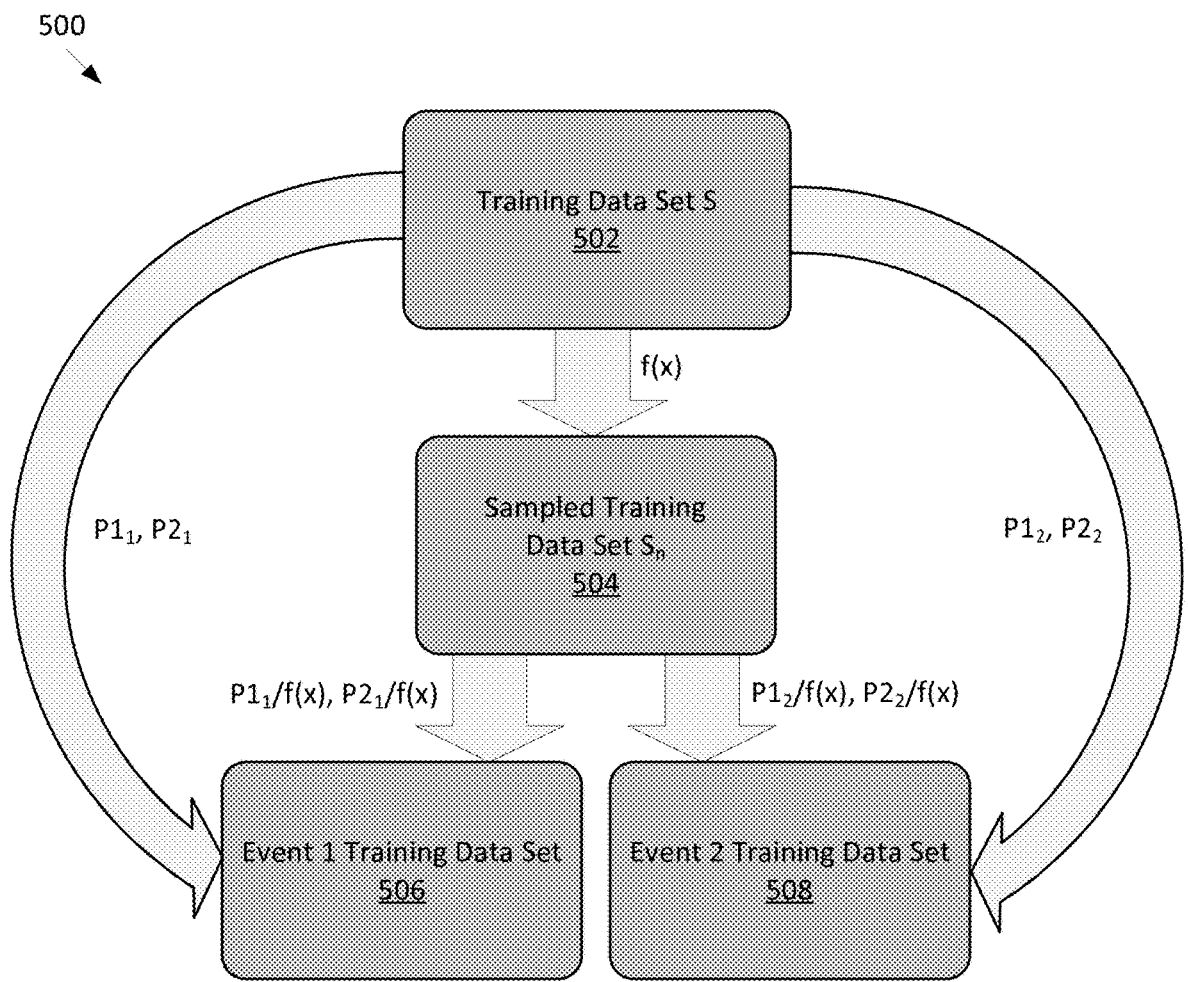
FIG. 5 depicts an illustrative block diagram for selecting training data for generating a predictive model, in accordance with various embodiments of the present disclosure.

In some embodiments, feature generator 114 can sample event logs from event log data store 108 in accordance with a defined sampling equation, f(x). In such embodiments, the probabilities, $P_1$ and $P_2$ described above, may need to be modified to reflect this defined sampling equation. To accomplish this, $P_1$ and $P_2$ can be divided by the equation f(x) to arrive at the probabilities that can be utilized to obtain the desired number of positive and negative samples. As such, the probability for selecting positive samples could be represented as $P_1/f(x)$ and the probability for selecting negative samples could be represented as $P_2/f(x)$. An example of this is depicted in FIG. 5.

While depicted as operating after feature generator 114, it will be appreciated that training data collection module 118 could, in some embodiments, be implemented to operate on event log data store 108, as the training data set. In such an embodiment, feature generator 114 could directly produce training feature vectors 120 and labels 122.

Training feature vectors 120 can include the feature values discussed above. In addition, as can be seen, each of the training feature vectors can be associated with a respective label 122. The respective label of the training feature vector can identify whether the training feature vector is associated with a positive user or a negative user.

Training feature vectors 120 and the associated labels 122 can be output to predictive model generator 124. Predictive model generator 124 can be configured to utilize the training feature vectors 120 and the associated labels to generate, or update, a predictive model 126. To accomplish this, predictive model generator 124 can be configured to implement any of a number of machine learning algorithms that are known in the art. Examples of such algorithms include a decision tree learning algorithm, an artificial neural network learning algorithm (e.g., a deep learning algorithm), support vector machine learning algorithm, etc. Predictive model 126 can take the form of a decision tree, artificial neural network, support vector machine, etc. depending upon the machine learning algorithm implemented by predictive model generator 124 in generating predictive model 126.

Predictive model 126 can then be stored in predictive model data store 128. Predictive model data store 128 can include any number of predictive models where each of the predictive models is associated with a respective event for which the predictive model can be utilized to predict the occurrence of. Predictive model data store 128 each predictive model associated with the prediction of at least one event.

Figure 2:
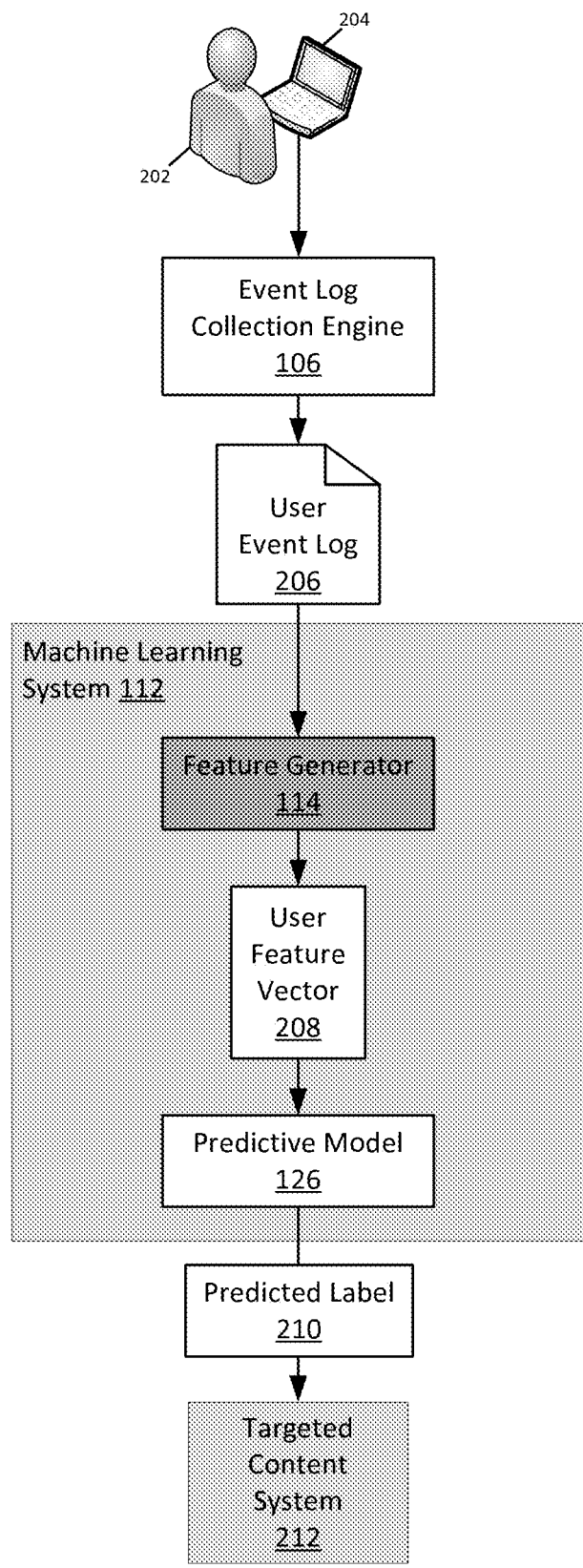
FIG. 2 depicts the illustrative machine learning environment of FIG. 1 performing an example prediction process, in accordance with embodiments of the present disclosure.

Moving to FIG. 2, this figure depicts the illustrative machine learning environment 100 of FIG. 1 performing an illustrative prediction process, in accordance with embodiments of the present disclosure. As depicted, machine learning environment 100 includes user 202 operating computing device 204. Users 202 can interact with one or more applications that are being executed by computing device 204. As mentioned in FIG. 1, a subset of these interactions can be captured as events in one or more event log entries associated with the user 202. Each event log entry can include, for example: an identifier of the event that precipitated the event log entry; an indicator of a time at which the identified event occurred; an indicator of the user and/or computing device that initiated the event; a type of the event (e.g., viewed website, conversion, etc.); any other suitable information concerning the event; or any combination thereof. The interactions can be captured via, for example, web beacons, pixel tracking, conventional application monitoring techniques, etc. It will be appreciated that these mechanisms for tracking the interaction of a user with a website or application are merely meant to be illustrative in nature and that any suitable mechanism for tracking such interactions can be used without departing from the scope of this disclosure.

Event log collection engine 106 can be configured to collect the above described event log entries and aggregate these entries into user event log 206. In various embodiments, the above mentioned event log entries may be aggregated into event log 206 with non-event data, or event independent data, such as user demographic information. This user demographic information can include, for example, gender of user, geographic location of the user, etc. Event log collection engine 106 can then be configured to pass user event log 206 to machine learning system 112.

Machine learning system 112 can be configured to utilize event log 206 to generate a predicted label for a given event. As used in this context, a predicted label refers to a prediction of whether user 202 is likely to perform the given event. To accomplish this, machine learning system 112 can take event log 206, produced by event log collection engine 106, as input. In machine learning system 112, event log 206 can be initially processed by feature generator 114. Feature generator 114 can be configured to transform event log 206 into features suitable for predicting the occurrence of the given event with respect to user 202. These features can take the form of, for example, user feature vector 208. In embodiments, each feature can be associated with any of the events, or non-event demographic information, discussed herein. To produce user feature vector 208, feature generator 114 can be configured to generate a feature value associated with each feature. This feature value can be generated in a manner to encode information concerning an amount of time that has passed since an event associated with the feature occurred and/or a frequency of the occurrence of the event associated with the feature. Such a process is described in detail in reference to FIG. 1, above.

Once the user feature vector 208 is produced by feature generator 114, user feature vector 208 can be passed to predictive model 126. By way of reminder, predictive model 126 is the predictive model produced through the procedures described in reference to FIG. 1. In embodiments, predictive model 126 could be selected from predictive model data store 128 of FIG. 1, based on the given event for which prediction is sought. It will be appreciated that user feature vector 208 could be passed to any number of additional, or alternative, predictive models associated with additional, or alternative events for which a prediction is desired. Such events can be referred to herein as target events.

Predicted label 210 is output by predictive model 126 in response to user feature vector 208. Predicted label 210 can indicate that a given event (i.e., a target event) is likely to occur with respect to user 202 or that the given event is not likely to occur based on the events indicated within the user feature vector, and the associated feature values for those events. Predicted label 210 can be output to, for example, a targeted content system 212. The predicted label can enable the targeted content system to determine targeted content to transmit to user 202.

Figure 3:
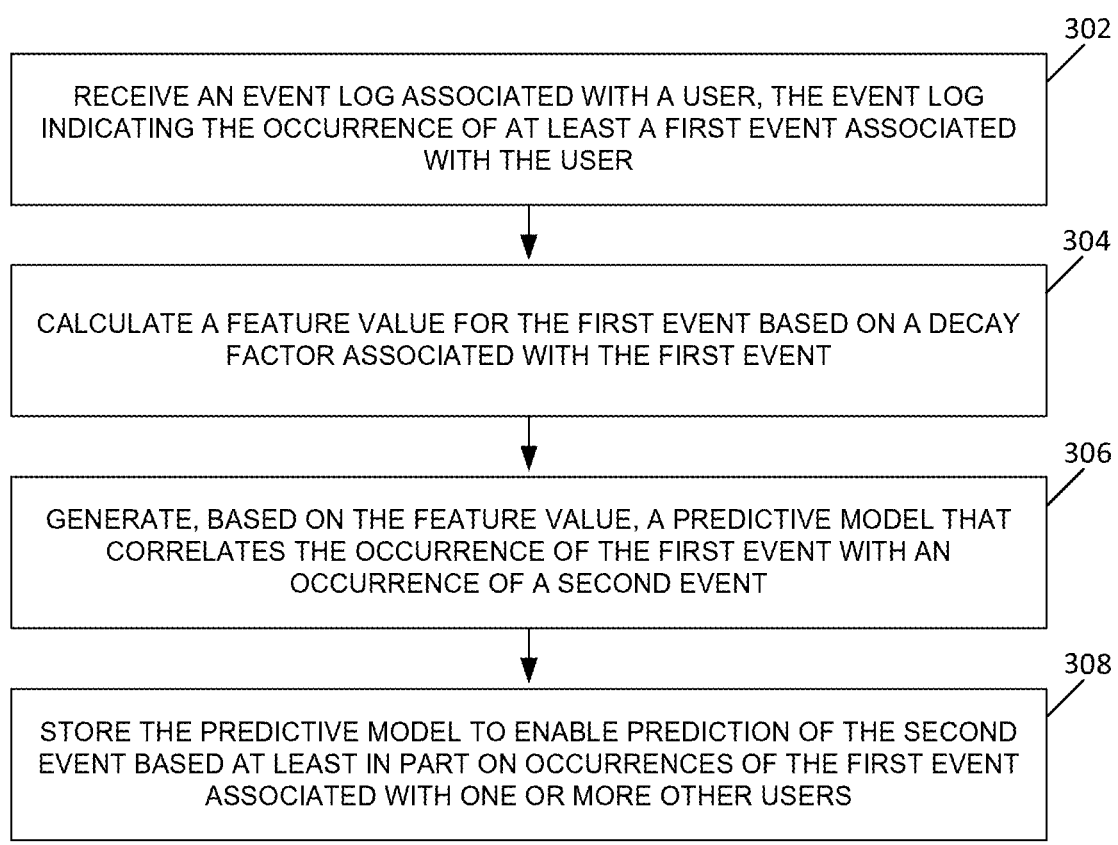
FIG. 3 depicts an illustrative process flow for generating and storing a predictive model, in accordance with various embodiments of the present disclosure.

FIG. 3 depicts an illustrative process flow 300 for generating and storing a predictive model, in accordance with various embodiments of the present disclosure. Process flow 300 can be carried out by components of machine learning system 112 of FIGS. 1 & 2. Process flow 300 can begin at block 302 where an event log associated with a user of a plurality of users is received. It will be appreciated that such an event log would generally be accompanied by event logs for the remaining users of the plurality of users, however, for the sake of simplicity; process flow 300 is described in reference to a single event log. It will be understood however, that any additional event logs can be processed in a similar manner to the single event log described in reference to process flow 300. The event log received at block 302 can include an indication of the occurrence of a first event. It will also be appreciated that the event log received at block 302 could include indications of the occurrence of any number of additional events; however, for the sake of simplicity a single event is referred to with respect to the process flow 300.

Moving to block 304, a feature value for the first event is calculated based on a decay factor associated with the first event. In some embodiments, the feature value can also, or alternatively, be calculated based on a jump factor associated with the first event. For example, suppose the event log indicates multiple occurrences of the first event for the user. In such an example, each occurrence of the first event could cause the feature value to increase by the jump factor. As discussed in reference to FIG. 1, the decay factor and the jump factor can be uniform across events or can be event dependent. In embodiments, where the decay factor is event dependent, block 304 can also include selecting the decay factor from a number of decay factors. Each of the number of decay factors can be associated with one or more events to which the decay factor is to be applied. Likewise, where the jump factor is event dependent, block 304 can also include selecting the jump factor from a number of jump factors. Each of the number of jump factors can be associated with one or more events to which the jump factor is to be applied. In some embodiments, generating the feature value can be limited based on a maximum threshold. Such a maximum threshold can limit the effect of multiple occurrences of the event on the feature value, by essentially capping the feature value at the maximum threshold. Additional aspects of calculating a feature value are discussed in greater detail in reference to FIG. 1.

While discussed above in reference to a single event, it will be understood any additional events, indicated by the event log as having occurred, can be processed in a similar manner to the first event. For example, the event log for the user can also indicate occurrences of a number of additional events associated with the user. In such an example, a corresponding number of additional feature values can be generated. Each of the additional feature values can be respectively associated with a separate event. As with the feature value discussed above, each of the additional feature values can be based on an amount of time that has passed since the occurrence of the respectively associated additional event.

At block 306 a predictive model is generated that correlates the occurrence of the first event with an occurrence of a second event. Such a second event is also referred to herein as a target event. The predictive model can be generated utilizing the feature value calculated at block 304. Such a predictive model can be generated utilizing any of a number of machine learning algorithms that are known in the art. Examples of such algorithms include a decision tree learning algorithm, an artificial neural network learning algorithm (e.g., a deep learning algorithm), support vector machine learning algorithm, etc. The resulting predictive model can take the form of a decision tree, artificial neural network, support vector machine, etc. depending upon the machine learning algorithm utilized. Finally, at block 308, the predictive model is stored (e.g., in predictive model data store 128 of FIG. 1. In embodiments, the predictive model can be stored in conjunction with any number of additional predictive models that are trained, as described herein, to predict the occurrence of respective target events.

Figure 4:
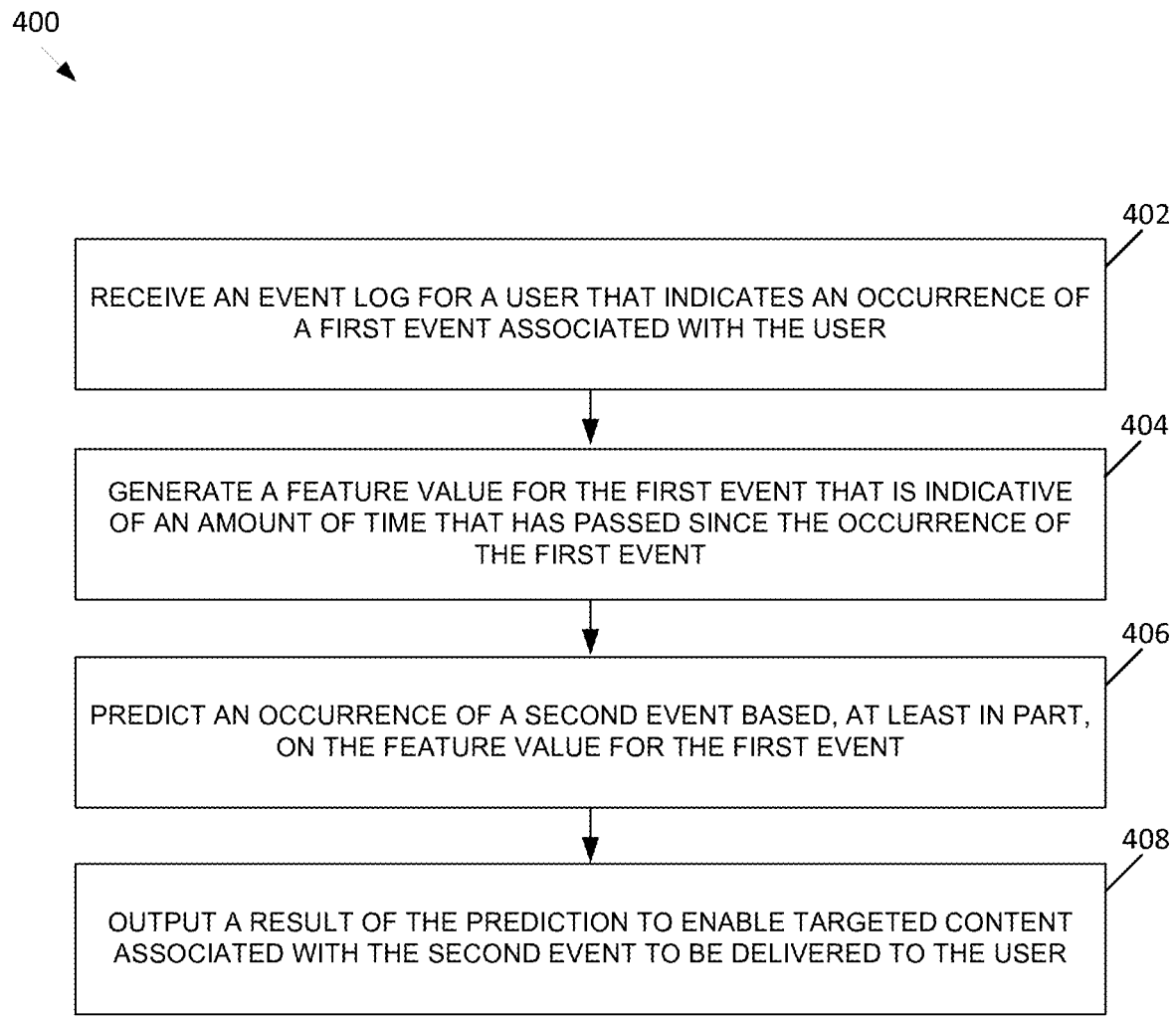
FIG. 4 depicts an illustrative process flow for predicting an occurrence of an event, in accordance with various embodiments of the present disclosure.

FIG. 4 depicts an illustrative process flow 400 for predicting an occurrence of an event, in accordance with various embodiments of the present disclosure. Process flow 400 can be carried out by components of machine learning system 112 of FIGS. 1 & 2. Process flow 400 can begin at block 402 where an event log associated with a user is received. Such an event log can include an indication of the occurrence of a first event. It will also be appreciated that the event log received at block 402 could include indications of the occurrences of any number of additional events; however, for the sake of simplicity a single event is referred to with respect to the process flow 400.

Moving to block 404, a feature value for the first event is calculated based on a decay factor associated with the first event. In some embodiments, the feature value can also, or alternatively, be calculated based on a jump factor associated with the first event. For example, suppose the event log indicates multiple occurrences of the first event for the user. In such an example, each occurrence of the first event could cause the feature value to increase by the jump factor. As discussed in reference to FIG. 1, the decay factor and the jump factor can be uniform across events or can be event dependent. In embodiments, where the decay factor is event dependent, block 404 can also include selecting the decay factor from a number of decay factors. Each of the number of decay factors can be associated with one or more events to which the decay factor is to be applied. Likewise, where the jump factor is event dependent, block 404 can also include selecting the jump factor from a number of jump factors. Each of the number of jump factors can be associated with one or more events to which the jump factor is to be applied. In some embodiments, generating the feature value can be limited based on a maximum threshold. Such a maximum threshold can limit the effect of multiple occurrences of the event on the feature value, by essentially capping the feature value at the maximum threshold. Additional aspects of calculating a feature value are discussed in greater detail in reference to FIG. 1.

While discussed above in reference to a single event, it will be understood any additional events, indicated by the event log as having occurred, can be processed in a similar manner to the first event. For example, the event log for the user can also indicate occurrences of a number of additional events. In such an example, a corresponding number of additional feature values can be generated. Each of the additional feature values can be respectively associated with a separate event. As with the feature value discussed above, each of the additional feature values can be based on an amount of time that has passed since the occurrence of the respectively associated additional event.

At block 406 a predictive model, such as that generated by FIG. 3, or depicted in FIGS. 1 & 2, can be utilized in conjunction with the above discussed feature value to predict the occurrence of a second event, based on the occurrence of the first event reflected in the degenerated feature value. Finally, at block 408, the result of the prediction can be output to enable targeted content associated with the second event to be delivered to the user.

In some instances, storing all collected training data may not be possible due to limited amount of space and/or processing capabilities that may limit the amount of data that can be processed. As such, the training data may need to be sampled. FIG. 5 depicts an illustrative block diagram 500 for sampling training data to be utilized in generating a predictive model, in accordance with various embodiments of the present disclosure. FIG. 5 depicts a training data set 502. Training data set 502 represents all training data that has been collected for prediction of various events.

In general, as discussed in reference to FIG. 1, when selecting training data to generate a predictive model for a given event, suppose 'a' positive samples (e.g., users) and 'b' negative samples are needed to generate the predictive model for event 'e.' Further suppose there are a total of 'A' positive samples and 'B' negative samples in training data set 502 for a given event 'e.' In such a scenario, if a sample is positive, the sample can be selected from training data set 502 in accordance with a probability of P1=a/A. If a sample is negative, the sample can be selected from training data set 502 in accordance with a probability P2=b/B. These values can vary depending on the event for which the model is to be generated.

FIG. 5 depicts two event training data sets 506 and 508 that have been assembled to train predictive models to predict the occurrence of event 1 and event 2, respectively. As can be seen, event 1 training data set 506 can be arrived at by selecting samples directly from training data set 502 in accordance with probabilities $P1_1$ for positive samples and $P2_1$ for negative samples. Likewise, event 2 training data set 508 can be arrived at by selecting samples directly from training data set 502 in accordance with probabilities $P1_2$ for positive samples and $P2_2$ for negative samples.

The above described scenario works so long as all training data is available from which to select the specific event training data sets. As mentioned above, however, maintaining all training data is often not feasible. As such, in some embodiments, a sampled training data set 504 can be produced to represent training data set 502. Sampled training data set is produced by sampling training data set 502 in accordance with a defined sampling equation, f(x). As an example, sampling equation f(x) can be arrived at in accordance with the following considerations. First assume a user has features, and targets, of $F_1, F_2, \ldots F_m$. Let $F_{1p}$ denote the total of positive $F_1$ in training data set 502 and let $F_{1n}$ denote the total of negative $F_1$ in training data set 502. In such an example, f(x) can be defined as $$f(x) := \min\left(\max\left(fmin, \frac{K}{f_{1_p}}, \frac{K}{f_{2_p}}, \ldots\right), 1\right) \quad \text{Eq. 4}$$

where fmin is the minimum rate of sampling, and K is the maximum number of positive samples the system can handle.

When sampling from sampled training data set 504, the probabilities, P1 and P2 described above, may need to be modified to reflect this defined sampling equation. To accomplish this, P1 and P2 can be divided by the equation f(x) to arrive at the probabilities that can be utilized to obtain the desired number of positive and negative samples. As such, the probability for selecting positive samples could be represented as P1/f(x) and the probability for selecting negative samples could be represented as P2/f(x). Based on this, event 1 training data set 506 can also be arrived at by selecting samples from sampled training data set 504 in accordance with probabilities $P1_1/f(x)$ for positive samples and $P2_1/f(x)$ for negative samples. Likewise, event 2 training data set 508 can be arrived at by selecting samples directly from sampled training data set 504 in accordance with probabilities $P1_2/f(x)$ for positive samples and $P2_2/f(x)$ for negative samples.

In the above described scenario, it is possible to encounter a situation where there are not sufficient positive samples and/or negative samples for a specific target event to produce a training data set for that specific target event. This can be especially true where the sampled training data set 504 was produced prior to identification of the specified target event. In such a scenario, one solution is to rebuild the sampled training data set with a sufficient number of both positive and negative samples. Another solution would be to append the current sampled training data set 504 with new samples to achieve the number of positive samples and negative sample for the specific target event. In such a scenario, a the sampling scheme may need to be carefully selected such that the probability of a sample in the sampled training data set is $f_{new}(x)\text{-}f_{old}(x)$, where $f_{old}(x)$ represents the sampling function discussed above and $f_{new}(x)$ represents a new sampling function for the appended samples.

Figure 6:
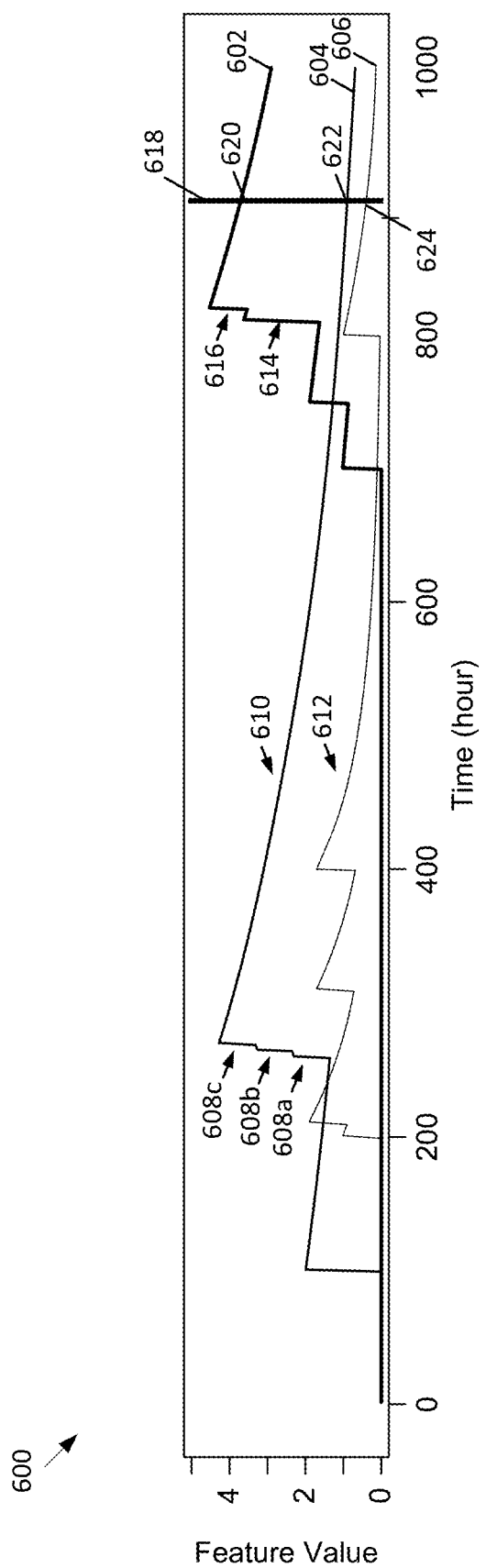
FIG. 6 depicts an illustrative graph representing time horizons of various events, in accordance with various embodiments of the present disclosure.

FIG. 6 depicts an illustrative graph 600 representing feature values of events, in accordance with various embodiments of the present disclosure. Graph 600 depicts time across the x-axis and feature values across the y-axis. As depicted, graph 600 includes feature value representations for three events, a first event 602, a second event 604, and a third event 606. Each event is depicted by a line having a different weight. Each of the vertical rises (e.g., 608*a-c*, 614, and 616) depicted in graph 600 illustrate occurrence of the respectively associated event. The downward curving portions (e.g., 610 and 612) depicted in graph 600 illustrate the effect of the decay factor. Line 618 depicts the point at which feature values were calculated for the depicted events. As such, the feature value generated for the first event is represented by 620. The feature value for generated for the second event is represented by 622. Finally, the feature value for the third event is represented by 624.

Figure 7:
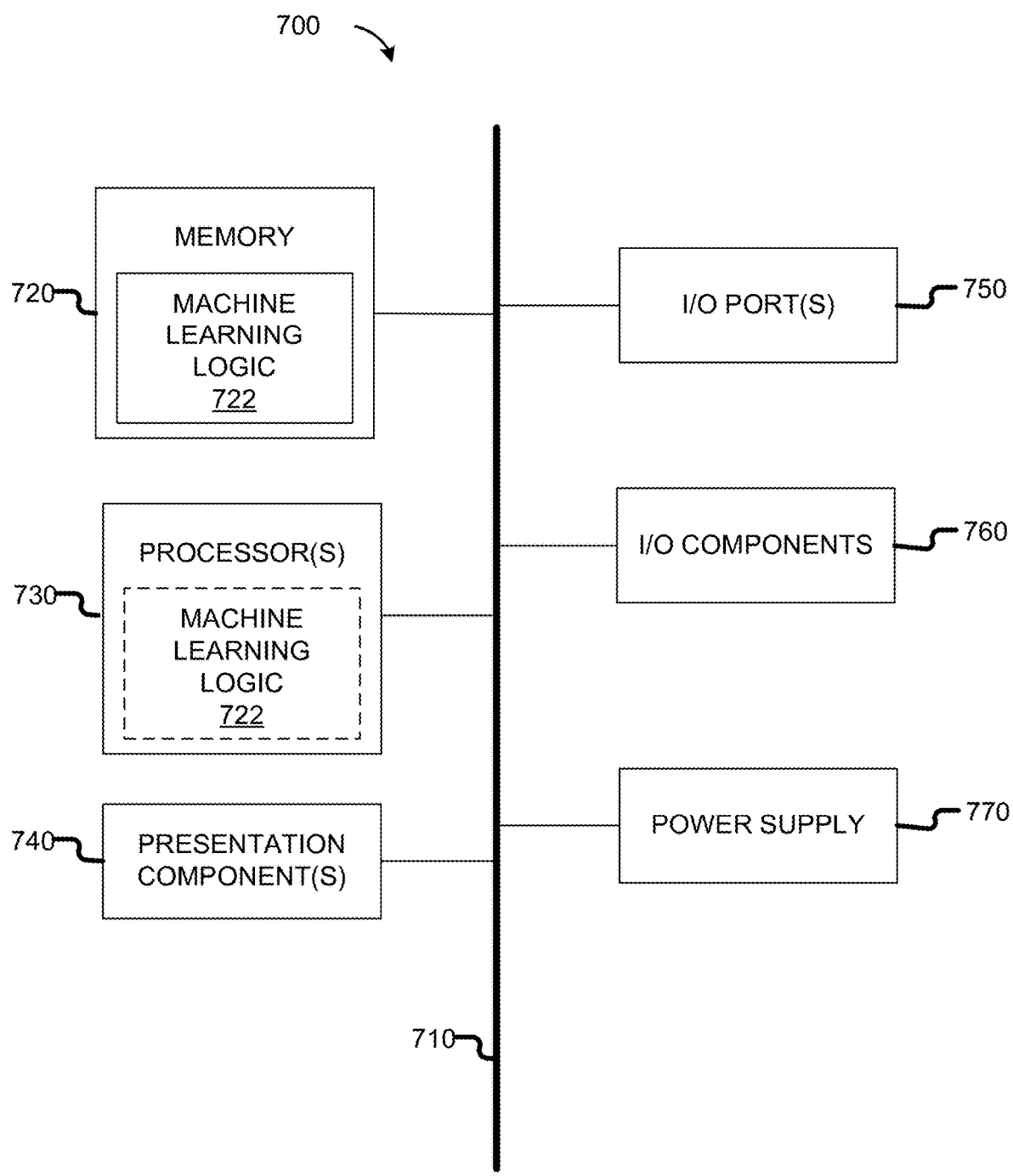
FIG. 7 is a block diagram of an example computing device in which various embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment, or computing platform, for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 7, computing device 700 includes a bus 710 that directly or indirectly couples the following devices: memory 720, one or more processors 730, one or more presentation components 740, input/output (I/O) ports 770, I/O components 760, and an illustrative power supply 750. Bus 710 represents what may be one or more busses (such as an address bus, data bus, or combination thereof). Although depicted in FIG. 7, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 740 while also being one of the I/O components 760. As another example, processors have memory integrated therewith in the form of cache; however, there is no overlap between the one or more processors 730 and the memory 720. A person having ordinary skill in the art will readily recognize that such is the nature of the art, and it is reiterated that the diagram of FIG. 7 merely depicts an illustrative computing device that can be used in connection with one or more embodiments of the present invention. It should also be noticed that distinction is not made between such categories as "workstation," "server," "laptop," "hand-held device," etc., as all such devices are contemplated to be within the scope of computing device 700 of FIG. 7 and any other reference to "computing device," unless the context clearly indicates otherwise.

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 720 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 700 includes one or more processors 730 that read data from various entities such as memory 720 or I/O components 760. Presentation component(s) 740 present data indications to a user or other device. Illustrative presentation components include a display device, speaker, printing component, vibrating component, etc.

In various embodiments, memory 720 includes, in particular, temporal and persistent copies of machine learning logic 722. Machine learning logic 722 includes instructions that, when executed by one or more processors 730, result in computing device 700 any of the processes described above. In various embodiments, machine learning logic 722 includes instructions that, when executed by processor 730, result in computing device 700 performing various functions described herein.

In some embodiments, one or more processors 730 may be packaged together with machine learning logic 722. In some embodiments, one or more processors 730 may be packaged together with machine learning logic 722 to form a System in Package (SiP). In some embodiments, one or more processors 730 can be integrated on the same die with machine learning logic 722. In some embodiments, processor 730 can be integrated on the same die with machine learning logic 722 to form a System on Chip (SoC).

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   receiving an event log, for a user, that indicates an occurrence of a first event associated with the user and one or more second events associated with the user, wherein the first event comprises a first procurement of at least one of a first product or a first service by the user in response to provision of first targeted content to the user and the one or more second events comprise a second procurement of at least one of a second product or a second service by the user in response to provision of second targeted content to the user, wherein the at least one of the first product or the first service is different than the at least one of the second product or the second service;
   generating a feature value, for the first event, that is indicative of an amount of time that has passed since the occurrence of the first event and a frequency of occurrences of the first event, wherein the generating the feature value comprises:
      assigning an initial value for a first occurrence of the first event;
      determining a second amount of time based, at least in part, on a difference between a current time and a past time of the first occurrence of the first event;
      combining a decay factor associated with the first event with the second amount of time; and
      applying a jump factor, reduced by the combination of the decay factor with the second amount of time, to the initial value in response to one or more occurrences of the first event after the first occurrence;
   predicting a predicted occurrence of a second event based, at least in part, on the feature value for the first event that is indicative of the amount of time that has passed since the occurrence of the first event and the frequency of occurrences of the first event; and
   controlling transmission of targeted content to the user based, at least in part, on the predicted occurrence of the second event.

2. The computer-implemented method of claim 1, wherein the event log for the user also indicates occurrences of a plurality of additional events associated with the user, the method comprising:
   generating a plurality of additional feature values, each of the plurality of additional feature values associated with an additional event of the plurality of additional events and based, at least in part, on an amount of time that has passed since an occurrence of the additional event.

3. The computer-implemented method of claim 1, wherein generating the feature value for the first event comprises:
   selecting the decay factor from a plurality of decay factors that are respectively associated with one or more events.

4. The computer-implemented method of claim 1, comprising:
   generating a third feature value, for a third event, that is indicative of a frequency of an occurrence of the third event;
   predicting a predicted occurrence of a fourth event based, at least in part, on the third feature value for the third event; and
   controlling transmission of third targeted content to the user based, at least in part, on the predicted occurrence of the fourth event.

5. The computer-implemented method of claim 1, wherein the first event comprises a visit to a website by the user.

6. The computer-implemented method of claim 1, wherein the event log for the user indicates multiple occurrences of the first event associated with the user, the method comprising:
   selecting the jump factor from a plurality of jump factors that are respectively associated with one or more events.

7. The computer-implemented method of claim 1, wherein the event log for the user indicates multiple occurrences of the first event associated with the user, wherein generating the feature value is based, at least in part, on a maximum threshold that limits an effect of the multiple occurrences on the feature value.

8. The computer-implemented method of claim 1, wherein the first event comprises viewing of content by the user.

9. The computer-implemented method of claim 1, wherein the first event comprises selection of content by the user.

10. The computer-implemented method of claim 1, wherein the first event comprises request for at least one of the product or the service by the user.

11. One or more computer-readable storage media having instructions stored thereon, which, when executed by one or more processors, cause the one or more processors to:
    receive an event log associated with a user of a plurality of users, the event log indicating an occurrence of at least a first event associated with the user and one or more second events associated with the user, wherein the first event comprises a first procurement of at least one of a first product or a first service by the user in response to provision of first targeted content to the user and the one or more second events comprise a second procurement of at least one of a second product or a second service by the user in response to provision of second targeted content to the user, wherein the at least one of the first product or the first service is different than the at least one of the second product or the second service;
    generate a feature value, for the first event, that is indicative of an amount of time that has passed since the occurrence of the first event and a frequency of occurrences of the first event, wherein the generating the feature value comprises:
       assigning an initial value for a first occurrence of the first event; and applying a jump factor to the initial value in response to one or more occurrences of the first event after the first occurrence;

generate, utilizing the feature value, a predictive model that correlates the occurrence of the first event with a predicted occurrence of a second event; and predict the second event based, at least in part, on occurrences of the first event associated with one or more other users.

12. The one or more computer-readable storage media of claim 11, wherein the event log for the user also indicates occurrences of a plurality of additional events associated with the user, and wherein the instructions, when executed by the one or more processors, cause the one or more processors to:

generate a plurality of additional feature values, wherein each of the plurality of additional feature values is associated with an additional event of the plurality of additional events and is based, at least in part, on an amount of time that has passed since an occurrence of the additional event, wherein to generate the predictive model utilizes the plurality of additional feature values to correlate the occurrences of the plurality of additional events with the predicted occurrence of the second event.

13. The one or more computer-readable storage media of claim 11, wherein the event log for the user indicates multiple occurrences of the first event associated with the user, and wherein to generate the feature value for the first event is also based, at least in part, on a decay factor associated with the first event.

14. The one or more computer-readable storage media of claim 11, wherein the instructions, when executed by the one or more processors, cause the one or more processors to:

select the jump factor from a plurality of jump factors that are also respectively associated with one or more events.

15. The one or more computer-readable storage media of claim 13, wherein to generate the feature value is based, at least in part, on a maximum threshold that limits an effect of the multiple occurrences on the feature value.

16. The one or more computer-readable storage media of claim 13, wherein to generate the feature value is based, at least in part, on the equation:

$$f_E(T) = \Sigma_{i:E_i=E} J_E e^{-\lambda_E(T-T_i)},$$

where $f_E(T)$ is the feature value for the first event at time T, $\lambda_E$ is the decay factor associated with the first event, and $J_E$ is the jump factor associated with the first event.

17. A system, comprising:

one or more processors; and memory, coupled with the one or more processors, having instructions stored thereon, which, when executed by the one or more processors, cause the one or more processors to:

receive an event log associated with a user of a plurality of users, the event log indicating an occurrence of at least a first event associated with the user;

determine a plurality of decay factors, wherein each decay factor of the plurality of decay factors is a type of event;

select, in association with the first event, a decay factor from the plurality of decay factors based, at least in part, on an amount of time that has passed since a first occurrence of the first event;

generate a feature value, for the first event, that is indicative of an amount of time that has passed since the occurrence of the first event and a frequency of occurrences of the first event, wherein the generating the feature value comprises:

assigning an initial value for the first occurrence of the first event; and applying a jump factor, reduced by the decay factor corresponding to the amount of time that has passed since the first occurrence of the first event, to the initial value in response to one or more occurrences of the first event after the first occurrence;

generate, utilizing the feature value, a predictive model that correlates the occurrence of the first event with a predicted occurrence of a second event; and predict the second event based, at least in part, on occurrences of the first event associated with one or more other users.

18. The system of claim 17, wherein the event log is a first event log, the user is a first user, the feature value is a first feature value and wherein the instructions cause the one or more processors to:

receive a second event log for a second user that indicates an occurrence of a third event for the second user;

generate a second feature value for the third event that is indicative of an amount of time that has passed since the occurrence of the third event for the second user;

predict an occurrence of the second event based, at least in part, on the feature value for the output a result of the predicted occurrence of the second event to enable targeted content associated with the second event to be delivered to the user.

\* \* \* \* \*